April 21, 1925.
A. VILLEMAIRE
1,535,067
MOTOR DRIVEN GRUBBING MACHINE
Filed July 27, 1923   4 Sheets-Sheet 1
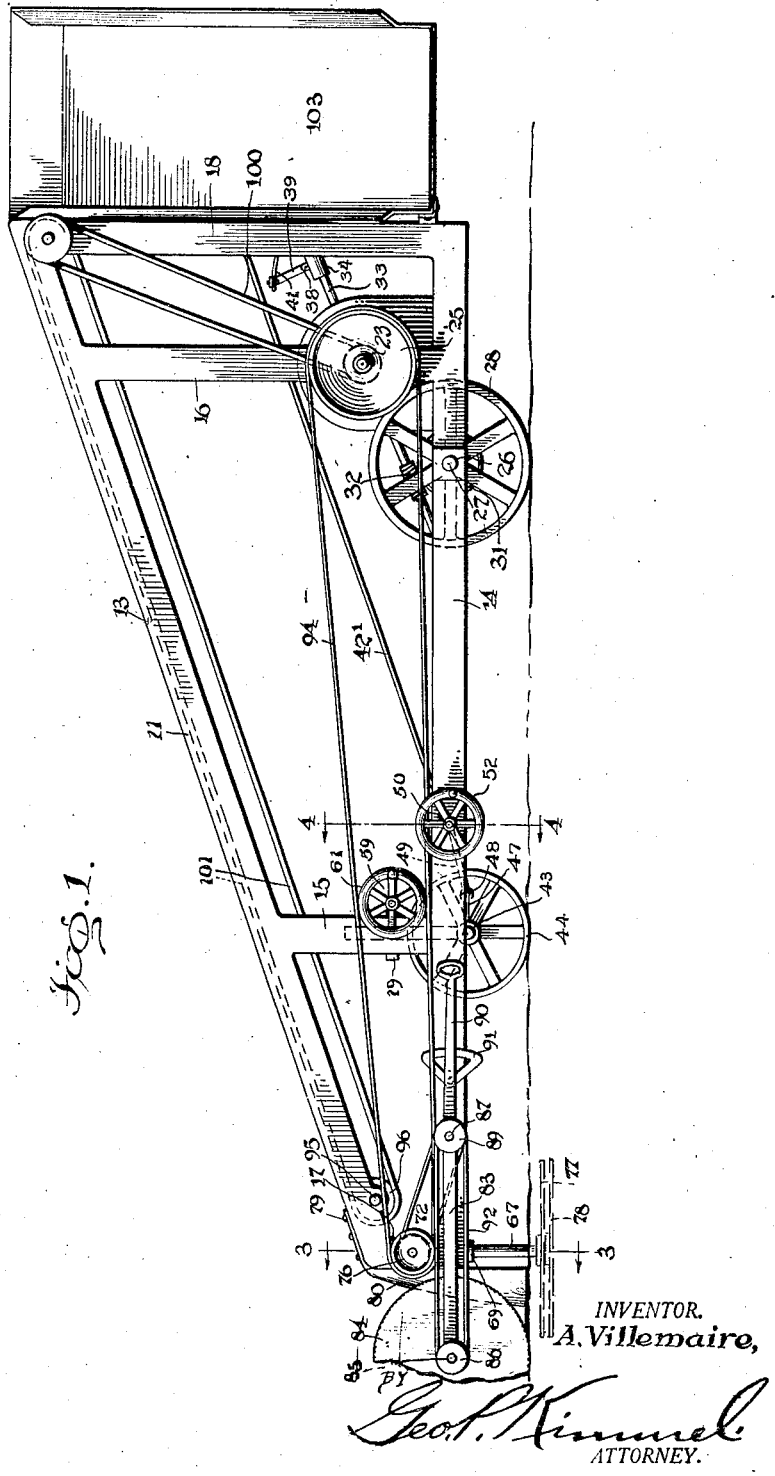
INVENTOR.
A. Villemaire,
BY
Geo. P. Kimmel
ATTORNEY.

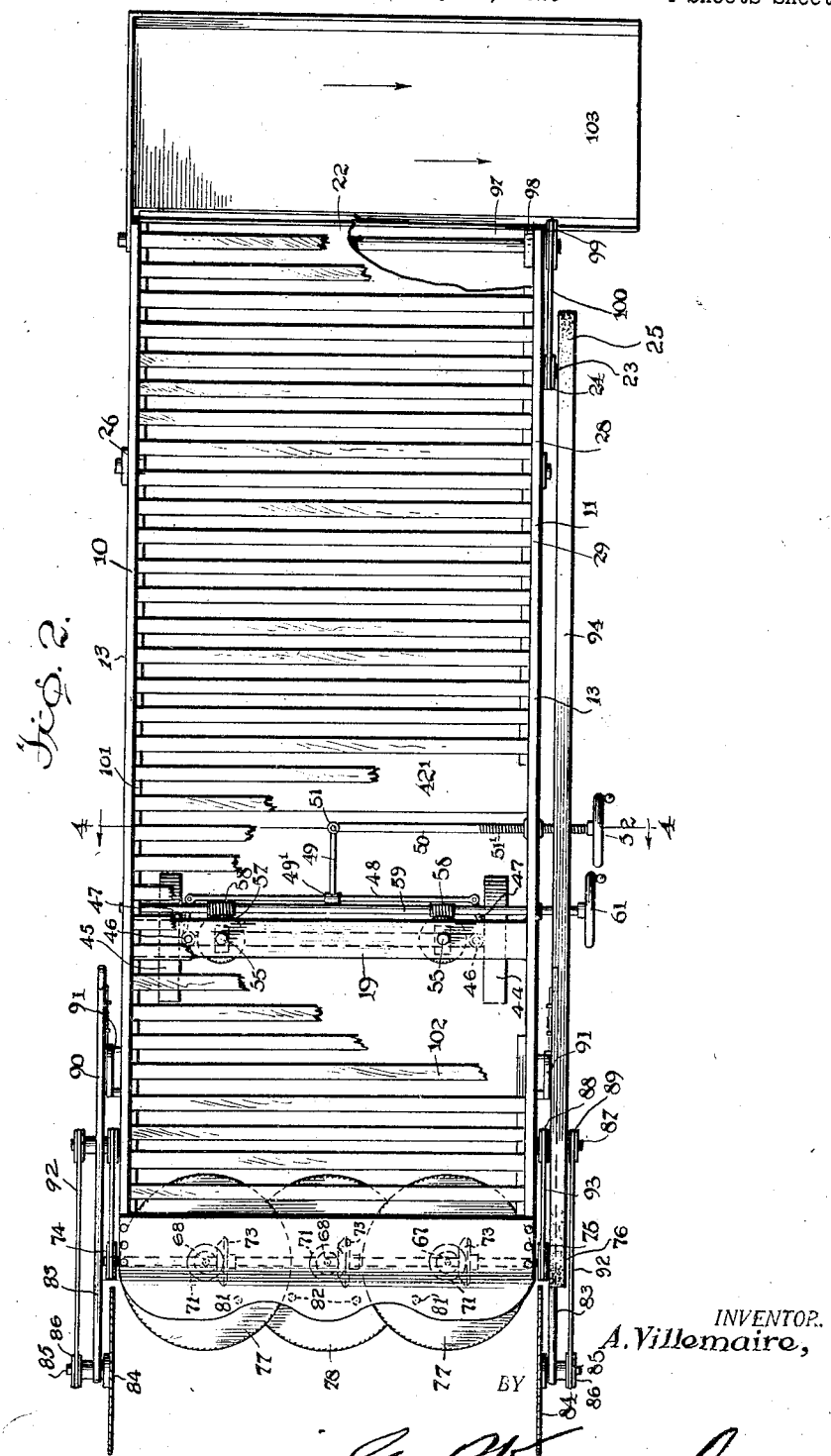

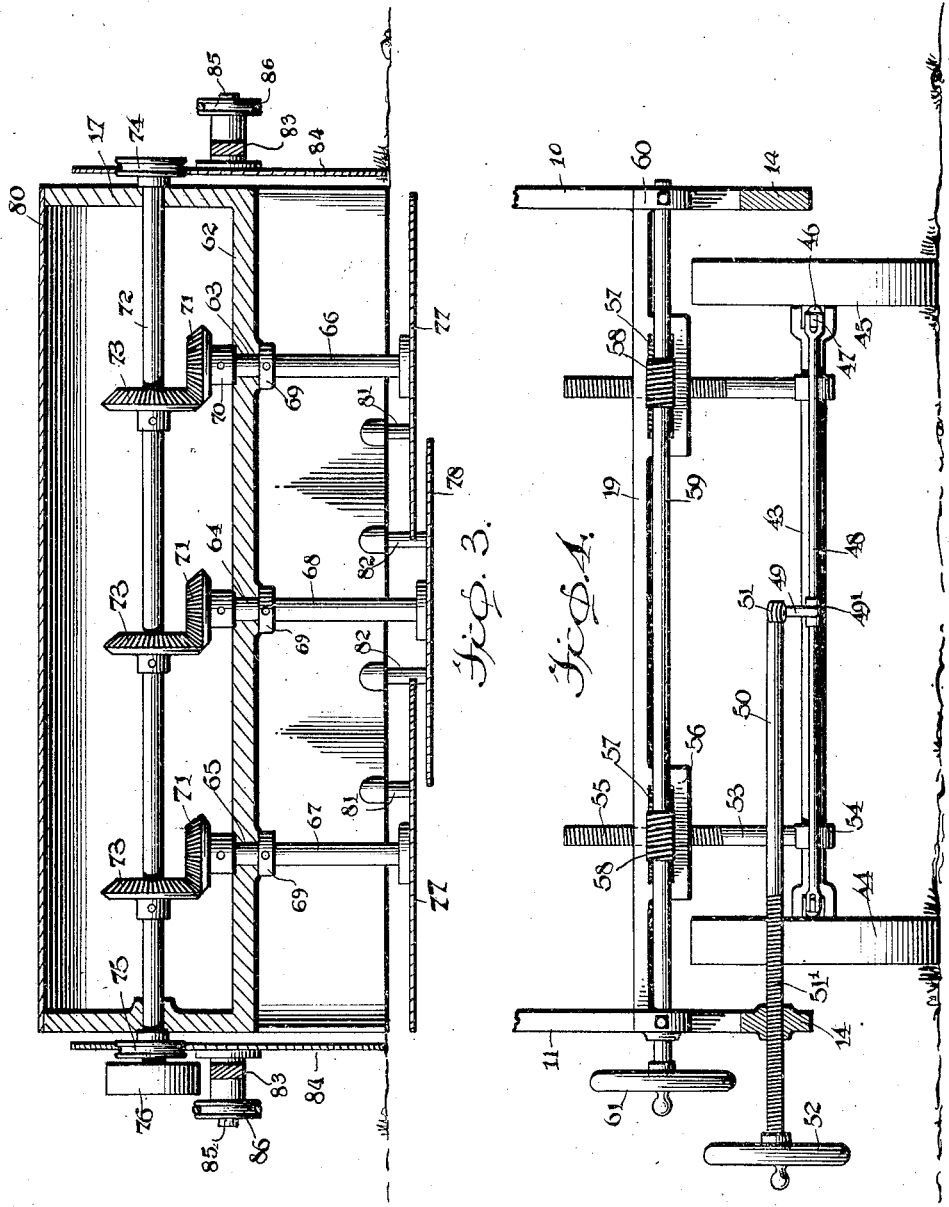

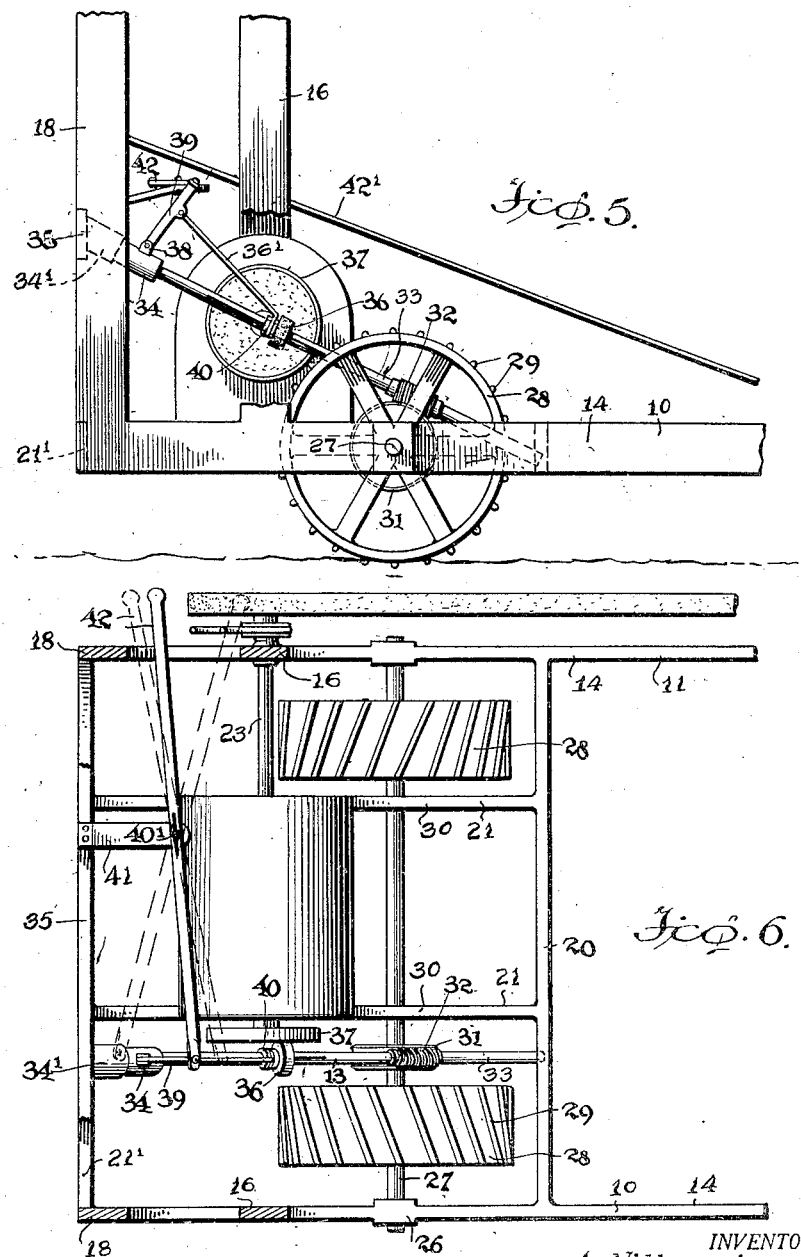

Patented Apr. 21, 1925.

1,535,067

UNITED STATES PATENT OFFICE.

ADOLARD VILLEMAIRE, OF RUSKIN, FLORIDA.

MOTOR-DRIVEN GRUBBING MACHINE.

Application filed July 27, 1923. Serial No. 654,278.

*To all whom it may concern:*

Be it known that I, ADOLARD VILLEMAIRE, a subject of the King of Great Britain, residing at Ruskin, in the county of Hillsborough and State of Florida, have invented certain new and useful Improvements in Motor-Driven Grubbing Machines, of which the following is a specification.

This invention relates to motor driven grubbing machines, designed primarily for use for the clearing of palmetto lands, but it is to be understood that a grubbing machine in accordance with this invention can be employed for any purposes for which it is found applicable, and the invention has for its object to provide, in a manner as hereafter set forth, a machine of such class having means for cutting palmetto growth more rapidly and neatly than the old method of grubbing by hand; for shaking off the dirt from the grubbed plant and placing it back on the soil; for stacking the grubbed plants in neat rows for burning or hauling; and capable of being quickly adjusted to provide for satisfactory operation when occasion requires, and further to set up a machine so balanced that the front end can be elevated and a draft appliance read'ly attached thereto for transportation purposes.

A further object of the invention is to provide, in a manner as hereinafter set forth, a grubbing machine for the purpose referred to, having means for cutting the palmetto growth in vertical divis'ons to be acted upon and cut by horizontally disposed saws, and to further provide a machine with means for conveying the grubbed growth in a manner whereby the dirt will be shaken off the growth and deposited on the soil, and further whereby the grubbed growth will be stacked for any purpose desired.

Further objects of the invention are to provide a grubbing machine in a manner as hereinafter referred to and for the purpose set forth, which is simple in its construction and arrangement, self-propelled, including vert'cally disposed adjustable saws, horizontally disposed adjustable saws, strong, durable, compact, thoroughly efficient and convenient in its use, readily assembled and comparatively inexpensive.

With the foregoing and other objects in view, the invention consists of the novel construct'on, combination and arrangement of parts, as hereinafter more specifically described and illustrated in the accompany'ng drawings, wherein is shown an embodiment of the invention, but it is to be understood that changes, variations and modificat'ons can be resorted to which come within the scope of the claims hereunto appended.

In the drawings wherein like reference characters denote corresponding parts throughout the several views:—

Figure 1 is a side elevation of a grubbing machine, in accordance with this invention.

Figure 2 is a top plan view, broken away.

Figure 3 is a section on line 3—3, Figure 1.

Figure 4 is a section on line 4—4, Figure 1.

Figure 5 is a side elevation and Figure 6 a top plan of a friction drive mechanism for traction purposes.

Referring to the drawings in detail, the machine comprises a body portion includ'ng a pair of side frames 10 and 11, standing on edge and triangular in contour. Each of these side frames consists of a top bar 13 which inclines downwardly from front to rear, a longitudinally extending bottom bar 14, a pair of intermediate vertically disposed bars 15, 16, a vertically disposed front bar 17 and a vertically disposed rear bar 18 which is of materially greater height than the front bar 13 and of materially greater height than the intermediate bars 15, 16. Each of the side frames can be set up of any suitable material, preferably from a metal casting of the des'red weight.

The intermediate bars 15 of the side frames are connected together by a transversely extending brace member 19, and the bottom bars 14 are connected together by a transversely extending brace member 20. Between the rear terminal portions of the bottom bars 14, and the brace member 20, there is arranged a combined brace and support, upon wh'ch is mounted a motor 22 of any desirable construction having suitable controlling means. The comb'ned brace and support consists of a pair of spaced longitudinally extending combined brace and supporting members 21 formed integral with the brace member 20 and further includes a transversely extending combined brace and supporting member 21′ which is secured to the bottom bar 14 at the rear end thereof. The motor shaft is indicated at 23, and extends through the intermediate bar 16 of the side frame 11, as well as projects outwardly from said bar 16. The end of the shaft 23 which projects outwardly from the bar 16, is provided with a pair of pulleys 24, 25. The former is of less diameter than the latter and is arranged inwardly with respect thereto.

The bottom bar 14 of the side frames, forwardly with respect to the vertical intermediate bars 16, is provided with bearings 26 in which the rear axle 27 of the machine is journaled. Carried by the axle 27, in proximity to each end thereof, as well as arranged inwardly with respect to a side frame, is a traction wheel 28 provided with ground gripping means, such as diagonally disposed ribs, as at 29. The axle 27 extends through the spaced parallel longitudinal members 30 of the combined brace and support 21. The axle 27 between the side frame 10 and one of the arms 30 has fixed thereto a worm wheel 31, which meshes with a worm 32 carried by an inclined transmission shaft 33, which is journaled at its forward or lower end in the brace member 20 and at its rear or upper end is eccentrically connected to a sleeve 34, journalled in an inclined bearing 34′ projecting forwardly from a brace member 35 arranged between and secured with the rear bars 18. The shaft 33 is provided with a friction driven disk 36, slidably adjusted on the shaft 33 and which is driven from a friction driving disk 37 carried on the inner end of the motor shaft 23. The sleeve 34 has its periphery provided with a pair of upstanding lugs 38, to which the lower end of a shifting lever 39 is pivotally connected. Leading from the lever 39, at a point intermediate its ends to a groove collar 40 which is sildably mounted on the shaft 33 and secured to the disk 36, is a shifting rod 36′ for said disk 36, to provide for the operative contact of the edge of the disk 36 with respect to the driving face of the disk 37. The lever 39 not only provides means for shifting the rod 36′, but also for shifting the sleeve 34, for bodily adjusting the shaft 33 to move the disk 36 into and out of contact with driving face of the disk 37.

The driving of the shaft 33, when the worm 31 engages with the worm gear 32, provides for the propelling of the machine.

The lever 39 has its upper end pivotally connected to the inner end of a transversely extending shifting rod 42, which has a pin and slot connection, as at 40′, to an arm 41 which extends forwardly from the brace member 35. The arm 41 is arranged above the bearing 34′. The rod 42 extends outwardly from the side frame 11, and any suitable means can be employed for retaining it in its adjusted position. A shield 42′ is secured between the side frames 10 and 11 and extends over the motor 22, axle 27 and the traction wheels 28. The shield 42′ projects forwardly from the rear bars 18 and extends to a point in proximity to the brace member 19.

The front axle of the machine is indicated at 43, and is arranged below the brace member 19. The front wheels are indicated at 44, 45, and each is carried by a spindle 46, pivotally connected in a known manner with an end of the axle 43. Each spindle 46 has an arm 47 projecting rearwardly therefrom, and pivotally attached to the said arms 47 is a connecting rod 48 forming an element of the steering device for the front wheels 44, 45.

The said steering device not only includes the arms 47 and connecting bar 48, but also an upright arm 49 provided with a collar 49′ loosely mounted centrally of the bar 48 and having a rotatable threaded shifting bar 50 connected therewith, as at 51, and in such manner whereby the rod 50 can rotate, at the same time being pivotally connected with the arm 49. The collar 49′ is held from lengthwise shifting on the bar 48. The threaded portion of the rod 50 is indicated at 51 and has threaded engagement with the bottom bar 14 of the side frame 11. The rod 50 projects outwardly from the said bar 14 and carries a turning wheel 52, and owing to the foregoing arrangement of elements, when the rod 50 is shifted in a transverse direction with respect to the frame, that is in an inward and outward direction, the machine is steered in the desired direction.

The forward portion of the machine is vertically adjustable, for the purpose of positioning the horizontal saws to be hereinafter referred to, at the desired point for satisfactory cutting of the growth and such adjustment is had through the medium of a pair of vertically disposed bars 53, each of which is fixedly secured, as at 54, to the front axle 43 in proximity to each end thereof. Each of the bars 53 is formed with a threaded upper end 55 and each of said bars 53 extends up through the brace member 19. Formed integral with the lower face of the brace member 19, at a point between its center and each end thereof, is a housing 56, in which is arranged a worm gear 57, which is formed with internal teeth for engagement with the threaded portion 55 of a bar 53 for the purpose of vertically moving the bar when the gear 57 is revolved. Engaging with the worm gears 57 are the worms 58, carried by a shaft 59, disposed transversely of the machine and mounted in bearings 60 which project rearwardly from the intermediate bars 15 of the side frames. The shaft 59 projects from one of the intermediate bars 15 and is provided with a hand wheel 61, and when the latter is revolved, the shaft 59 will be shifted, causing thereby the operation of the worm gears 57 and elevating or lowering the bars 53 depending in which direction the wheel 61 is revolved.

Connected to the bottom bars 14 of the side frames, and arranged in alignment with the front bars 17 of the side frames, is a transverse brace member 62, formed with vertical openings 63, 64 and 65. Extending through the openings 63 and 65 are vertically disposed shafts 66 and 67 respectively, and extending through the opening 64 is a vertically disposed shaft 68 of greater length than either of the shafts 66 or 67. Each of the shafts 66, 67 and 68 carries a stop collar 69 which abuts against the lower face of the member 62 and each of said shafts 66, 67 and 68 extends above the brace member 62, and has connected to its upper end the hub 70 of a bevelled pinion 71. The hubs 70 in connection with the stop collars 69 arrest vertical movement of the shafts 66, 67 and 68 with respect to the member 62.

Extending transversely of the machine and journaled in the end bars 17 of the side frames, is a shaft 72 which projects outwardly from each of said end bars 17, and the said shaft 72 is provided with bevelled gears 73, which mesh with the bevelled pinions 71, so that when the shaft 72 is operated, the shafts 66, 67 and 68 will be driven. One of the projecting ends of the shaft 72 is provided with a grooved pulley 74 and the other projecting end carries a grooved pulley 75, and a driving pulley 76.

Secured to the lower end of the shafts 66 and 67 is a horizontally disposed circular saw 77, and secured to the lower end of the shaft 68 is a horizontally disposed circular saw 78, which is arranged below the saws 77 and the said saw 78 is arranged in such relation with respect to the saws 77 whereby these latter will overlap the said saw 78.

Secured to the forward end of the side frames 10 and 11, by the hold-fast devices 79 is a deflecting member 80, which depends below the bottom bars 14 of the side frames 10 and 11 and is arranged over the forward portions of the saws 77 and 78. The saws 77 are maintained in spaced relation with respect to the deflector 80 by spacing lugs 81 which depend from the deflector 80 and extend to the upper faces of the saws 77. The saw 78 is maintained in spaced relation with respect to the deflector 80 and also with respect to the saws 77, by spacing lugs 82 which depend from the deflector 80 and extend to the upper face of the saw 78. The lugs 82 are of greater length than the lugs 81. The saws 77, 78 are operated when the shafts 66, 67 and 68 are driven from the shaft 72.

Projecting forwardly from the bottom bar 14 of each side frame, is a carrier 83 for a vertically disposed circular saw 84 which projects forwardly with respect to the horizontal saws, and the said vertical saws 84 are employed for cutting the growth in vertical divisions in advance of the operation on the growth by the horizontally disposed saws.

Mounted in the forward end of each carrier 83 is a shaft 85, having a saw 84 connected to its inner end and a grooved pulley 86 on its outer end. The rear end of a carrier 83 is pivotally mounted on a shaft 87, which is journaled in a bottom bar 14 of a side frame, as well as projecting outwardly therefrom, and the said shaft 87 is provided with a pair of grooved pulleys 88, 89. The carrier 83 has a lever arm 90 extending from the rear end thereof and associated with said lever arm is a pawl and rack device 91. The lever arm 90 is employed for elevating or lowering the carrier 83 for the purpose of positioning the saw 84 for the proper depth of cut and after the carrier 83 has been adjusted it is maintained in position by the pawl and rack device 91.

Extending from the pulley 89 to the pulley 86 is a drive belt 92 for the shaft 85, and extending from the pulley 88 to the pulley 75 is a drive belt 93 for the shaft 87.

The shaft 72, is driven through the medium of a belt connection 94 which extends from the pulley 25 to the pulley 76, and it is obvious that when the belt 94 is driven, the horizontal as well as the vertical saws will be operated.

Mounted in the top bars 13 of the side frames 10 and 11, near the forward end of said top bars 13, is a shaft 95 provided near each end and within the side frames with a pulley 96, and mounted in the top bars 13 of the side frames 10 and 11, at the rear end of said top bars 13, is a shaft 97 provided near each end and within the side frames with a pulley 98. One end of the shaft 97 projects from the top bar 13 of the side frame 11 and carries a grooved pulley 99, which is connected with the grooved pulley 24, by a drive belt 100. Operating over the pulleys 96 and 98 is a slatted endless conveyor consisting of a pair of endless flexible supports 101, having secured therewith spaced slats 102 which are disposed transversely with respect to the machine. When the motor 22 is operated, the conveyor will be shifted owing to the belt connection 100 between the pulleys 24 and 99.

Connected to the rear ends of the side frames 10 and 11, disposed transversely with respect to the machine, and extending downwardly at an inclination from the side frame 10, is a chute 103 of a length to project from the side frame 11.

The direction of travel of the machine as well as its speed is controlled by the position of the driven disk with respect to the driving face of the disk 37.

In operation, the motor is started, the saws and conveyor are thrown in gear. As the saws revolve the vertical saws are lowered to the proper depth to cut vertical divisions in the palmetto growth wide enough to fit the horizontal saws. The clutch to the traction wheels is next thrown in, and the machine is driven slowly forward. The palmetto roots are sawed off a few inches below the ground, directed on the conveyor belt, are thrown into the chute, and fall in a row clear of the machine. Any soil clinging to the palmettos is sifted out, back onto the ground through the slats of the conveyor belt. As the machine advances the machine is guided by the steering device, and the level of the saws is adjusted by the leveling wheel as the conditions might demand.

The front part of the machine can be lifted, and a tongue placed under it so that the front truck and saws will be lifted free of the ground and horses hitched to it for transporting over any considerable distances. This places little weight on the tongue since the machine is nearly counterbalanced by the position of the heavy motor to the rear of the traction axle 27.

From the foregoing description taken in connection with the accompanying drawings, a grubbing machine designed primarily for the clearing of palmetto lands is provided and rapidly and neatly cuts palmettos in a more satisfactory manner, as well as a more expeditious method than the old method of grubbing by hand, and although the preferred embodiment of the invention is as shown and described, yet changes in the details of construction can be had which will fall within the light of the invention as claimed.

What I claim is:—

1. A machine for the purpose set forth comprising a body portion, propelling means therefor, a series of horizontally disposed overlapping spaced saw elements depending below the forward end of the body portion, a vertically disposed saw element arranged forwardly of and at the outer side of each outer element of said series of horizontally disposed saw elements, a conveyor extending rearwardly from said saw elements, an operative drive for said horizontally disposed saw elements, an operative drive for said conveyor, an operative drive connection between said horizontally disposed saw elements and said vertically disposed saw elements, and an inclined chute leading from said conveyor.

2. A machine for the purpose set forth comprising a body portion, propelling means therefor, a series of horizontally disposed overlapping spaced saw elements depending below the forward end of the body portion, a vertically disposed saw element arranged forwardly of and at the outer side of each outer element of said series of horizontally disposed saw elements, a conveyor extending rearwardly from said saw elements, an operative drive for said horizontally disposed saw elements, an operative drive for said conveyor, an operative drive connection between said horizontally disposed saw elements and said vertically disposed saw elements, an inclined chute leading from said conveyor, and means for adjusting said vertically disposed saw elements.

3. A machine for the purpose set forth comprising a body portion, propelling means therefor, a series of horizontally disposed overlapping spaced saw elements depending below the forward end of the body portion, a vertically disposed saw element arranged forwardly of and at the outer side of each outer element of said series of horizontally disposed saw elements, a conveyor extending rearwardly from said saw elements, an operative drive for said horizontally disposed saw elements, an operative drive for said conveyor an operative drive connection between said horizontally disposed saw elements and said vertically disposed saw elements, an inclined chute leading from said conveyor, and means for vertically adjusting said body portion causing thereby the adjustment of said series of horizontally disposed saw elements.

4. A machine for the purpose set forth comprising a body portion, propelling means therefor, a series of horizontally disposed overlapping spaced saw elements depending below the forward end of the body portion, a vertically disposed saw element arranged forwardly of and at the outer side of each outer element of said series of horizontally disposed saw elements, a conveyor extending rearwardly from said saw elements, an operative drive for said horizontally disposed saw elements, an operative drive for said conveyor, an operative drive connection between said horizontally disposed saw elements and said vertically disposed saw elements, an inclined chute leading from said conveyor, means for vertically adjusting said body portion causing thereby the adjustment of said series of horizontally disposed saw elements, and means for adjusting said vertically disposed saw elements.

5. A machine for the purpose set forth comprising a body portion, means for propelling said body portion, a series of overlapping spaced horizontally disposed and a pair of disposed saw elements arranged at the forward end of said body portion, said horizontally disposed saw elements positioned below said body portion and transversely with respect thereto, said vertically disposed saw elements positioned at the ends of said series of elements and forwardly with respect thereto, an endless slatted conveyor supported by said body portion and extending rearwardly from said saw elements, and means for driving said conveyor and saw elements.

6. A machine for the purpose set forth comprising a body portion, means for propelling said body portion, a series of overlapping spaced horizontally disposed and a pair of disposed saw elements arranged at the forward end of said body portion, said horizontally disposed saw elements positioned below said body portion and transversely with respect thereto, said vertically disposed saw elements positioned at the ends of said series of elements and forwardly with respect thereto, an endless slatted conveyor supported by said body portion and extending rearwardly from said saw elements, means for driving said conveyor and saw elements, and a downwardly inclined chute.

7. A machine for the purpose set forth comprising a body portion, means for propelling said body portion, a series of overlapping spaced horizontally disposed and a pair of disposed saw elements arranged at the forward end of said body portion, said horizontally disposed saw elements positioned below said body portion and transversely with respect thereto, said vertically disposed saw elements positioned at the ends of said series of elements and forwardly with respect thereto, an endless slatted conveyor supported by said body portion and extending rearwardly from said saw elements, means for driving said conveyor and saw elements, a downwardly inclined chute and means to provide for the adjustment of said horizontally disposed saw elements.

8. A machine for the purpose set forth comprising a body portion, means for propelling said body portion, a series of overlapping spaced horizontally disposed and a pair of disposed saw elements arranged at the forward end of said body portion, said horizontally disposed saw elements positioned below said body portion and transversely with respect thereto, said vertically disposed saw elements positioned at the ends of said series of elements and forwardly with respect thereto, an endless slatted conveyor supported by said body portion and extending rearwardly from said saw elements, means for driving said conveyor and saw elements, a downwardly inclined chute and means to provide for the adjustment of said horizontally and vertically disposed saw elements.

9. A machine for the purpose set forth comprising a body portion, means arranged at the rear thereof for propelling said body portion, horizontally and vertically disposed saw elements arranged at the forward end of said body portion, an endless slatted conveyor supported by said body portion and extending rearwardly from said saw elements, means for driving said conveyor and saw elements from said propelling means, and a deflector arranged at the forward end of said body portion, depending therefrom and positioned over said horizontally disposed saw elements, said deflector arranged between said vertically disposed saw elements.

10. A machine for the purpose set forth comprising a body portion, means arranged at the rear thereof for propelling said body portion, horizontally and vertically disposed saw elements arranged at the forward end of said body portion, an endless slatted conveyor supported by said body portion and extending rearwardly from said saw elements, means for driving said conveyor and saw elements from said propelling means, means to provide for the adjustment of said horizontally disposed saw elements, and a deflector arranged at the forward end of said body portion, depending therefrom and positioned over said horizontally disposed saw elements, said deflector arranged between said vertically disposed saw elements.

11. A machine for the purpose set forth comprising a body portion, means arranged at the rear thereof for propelling said body portion, horizontally and vertically disposed saw elements arranged at the forward end of said body portion, an endless slatted conveyor supported by said body portion and extending rearwardly from said saw elements, means for driving said conveyor and saw elements from said propelling means, means to provide for the adjustment of said horizontally and vertically disposed saw elements, and a deflector arranged at the forward end of said body portion, depending therefrom and positioned over said horizontally disposed saw elements, said deflector arranged between said vertically disposed saw elements.

12. A machine for the purpose set forth comprising a body portion, a series of spaced overlapping horizontally disposed saw elements carried by and depending below the forward end of said body portion, said series positioned transversely with respect to said body portion, and a pair of vertically disposed saw elements each arranged exteriorly of one side of the body portion at the forward end thereof and further projected forwardly with respect to said series of saw elements, each of said vertically disposed saw elements arranged with respect to the outer side of an outer element of said series and further spaced therefrom.

In testimony whereof, I affix my signature hereto.

ADOLARD VILLEMAIRE.